United States Patent
Wilenski et al.

(10) Patent No.: US 10,766,241 B2
(45) Date of Patent: Sep. 8, 2020

(54) SYSTEMS AND METHODS FOR ADDITIVE MANUFACTURING

(71) Applicant: The Boeing Company, Chicago, IL (US)

(72) Inventors: Mark Stewart Wilenski, Mercer Island, WA (US); Michael Patrick Kozar, Mercer Island, WA (US); Nick Shadbeh Evans, Lynnwood, WA (US); Faraón Torres, Seattle, WA (US)

(73) Assignee: The Boeing Company, Chicago, IL (US)

( * ) Notice: Subject to any disclaimer, the term of this patent is extended or adjusted under 35 U.S.C. 154(b) by 475 days.

(21) Appl. No.: 15/356,420

(22) Filed: Nov. 18, 2016

(65) Prior Publication Data

US 2018/0141284 A1    May 24, 2018

(51) Int. Cl.
*B29C 64/135* (2017.01)
*B33Y 10/00* (2015.01)
(Continued)

(52) U.S. Cl.
CPC .......... *B33Y 10/00* (2014.12); *B29C 35/0805* (2013.01); *B29C 35/0866* (2013.01);
(Continued)

(58) Field of Classification Search
CPC ... B29C 64/106; B29C 64/118; B29C 64/112; B29C 64/124; B29C 64/129; B29C 64/135; B29C 64/165
See application file for complete search history.

(56) References Cited

U.S. PATENT DOCUMENTS 3,600,272 A    8/1971 Cortigene et al.
3,813,976 A    6/1974 Greer
(Continued)

FOREIGN PATENT DOCUMENTS

CN    103817937    5/2014
DE    201310103973    10/2014
(Continued)

OTHER PUBLICATIONS

Machine generated English translation of the abstract of JP2015174284, downloaded from Espacenet.com Jun. 12, 2018.
(Continued)

*Primary Examiner* — Timothy Kennedy
(74) *Attorney, Agent, or Firm* — Dascenzo Intellectual Property Law, P.C.

(57) ABSTRACT

Systems for additive manufacturing comprise a delivery guide configured to dispense a curable material to additively manufacture a part in sequential layers of the curable material, and a source of curing energy configured to direct the curing energy to a discrete region of the curable material forward of or at a location where a subsequent layer of the curable material is dispensed from the delivery guide against a preceding layer of the curable material to cure together the subsequent layer and the preceding layer. Methods of additively manufacturing comprise dispensing a subsequent layer of a curable material against a preceding layer of the curable material, and concurrently with the dispensing, directing curing energy to a discrete region of the curable material to cure together the subsequent layer and the preceding layer.

23 Claims, 1 Drawing Sheet

(51) Int. Cl.
*B29C 64/264* (2017.01)
*B29C 64/106* (2017.01)
*B29C 64/20* (2017.01)
*B33Y 30/00* (2015.01)
*B29C 35/08* (2006.01)

(52) U.S. Cl.
CPC .......... *B29C 64/106* (2017.08); *B29C 64/135* (2017.08); *B29C 64/20* (2017.08); *B29C 64/264* (2017.08); *B33Y 30/00* (2014.12)

(56) References Cited

U.S. PATENT DOCUMENTS

| | | | |
|---|---|---|---|
| 4,154,634 A | 5/1979 | Shobert et al. | |
| 4,378,343 A | 3/1983 | Sugiura et al. | |
| 4,435,246 A | 3/1984 | Green | |
| 4,929,402 A | 5/1990 | Hull | |
| 4,943,472 A | 7/1990 | Dyksterhouse et al. | |
| 5,204,124 A | 4/1993 | Secretan et al. | |
| 5,294,461 A | 3/1994 | Ishida | |
| 5,340,433 A | 8/1994 | Crump | |
| 5,398,193 A | 3/1995 | deAngelis | |
| 5,495,328 A | 2/1996 | Spence et al. | |
| 5,936,861 A | 8/1999 | Jang et al. | |
| 6,129,872 A | 10/2000 | Jang | |
| 6,149,856 A | 11/2000 | Zemel et al. | |
| 6,214,279 B1 | 4/2001 | Yang et al. | |
| 6,395,210 B1 | 5/2002 | Head et al. | |
| 6,537,052 B1 | 3/2003 | Adler | |
| 6,722,872 B1 | 4/2004 | Swanson et al. | |
| 7,114,943 B1 | 10/2006 | Fong et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,149,989 B2 | 10/2015 | Uckelmann | |
| 9,815,268 B2 | 11/2017 | Mark et al. | |
| 10,442,118 B2 | 10/2019 | Grewell | |
| 2001/0048184 A1 | 12/2001 | Ueno | |
| 2003/0044593 A1 | 3/2003 | Vaidyanathan et al. | |
| 2004/0119188 A1 | 6/2004 | Lowe | |
| 2005/0023719 A1 | 2/2005 | Nielsen et al. | |
| 2005/0038222 A1 | 2/2005 | Joshi et al. | |
| 2005/0093208 A1* | 5/2005 | Boyd | B29C 64/112 264/442 |
| 2005/0104241 A1 | 5/2005 | Kritchman et al. | |
| 2005/0116391 A1 | 6/2005 | Lindemann et al. | |
| 2005/0248065 A1 | 11/2005 | Owada | |
| 2006/0048881 A1* | 3/2006 | Evans | B29C 65/1658 156/64 |
| 2007/0029030 A1 | 2/2007 | McCowin | |
| 2008/0157437 A1* | 7/2008 | Nelson | B29C 70/38 264/405 |
| 2008/0213419 A1 | 9/2008 | Skubic et al. | |
| 2008/0257879 A1 | 10/2008 | Huskamp | |
| 2008/0315462 A1 | 12/2008 | Batzinger et al. | |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 | 2/2010 | Ingram, Jr. et al. | |
| 2010/0084087 A1 | 4/2010 | McCowin et al. | |
| 2010/0190005 A1 | 7/2010 | Nair et al. | |
| 2011/0147993 A1 | 6/2011 | Eshed et al. | |
| 2011/0195237 A1 | 8/2011 | Patel et al. | |
| 2011/0300301 A1 | 12/2011 | Fernando et al. | |
| 2012/0267345 A1* | 10/2012 | Clark | B29C 64/20 219/121.35 |
| 2014/0061974 A1 | 3/2014 | Tyler | |
| 2014/0086780 A1 | 3/2014 | Miller et al. | |
| 2014/0141166 A1 | 5/2014 | Rodgers | |
| 2014/0154347 A1 | 6/2014 | Dilworth et al. | |
| 2014/0232035 A1 | 8/2014 | Bheda | |
| 2014/0263534 A1 | 9/2014 | Post et al. | |
| 2014/0265000 A1 | 9/2014 | Magnotta et al. | |
| 2014/0265040 A1 | 9/2014 | Batchelder | |
| 2014/0291886 A1 | 10/2014 | Mark et al. | |
| 2014/0328964 A1 | 11/2014 | Mark et al. | |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 | 2/2015 | Tibor et al. | |
| 2015/0048553 A1 | 2/2015 | Dietrich et al. | |
| 2015/0140230 A1 | 5/2015 | Jones et al. | |
| 2015/0165691 A1 | 6/2015 | Mark et al. | |
| 2015/0174824 A1 | 6/2015 | Gifford et al. | |
| 2015/0217517 A1 | 8/2015 | Karpas et al. | |
| 2015/0239046 A1 | 8/2015 | McMahan et al. | |
| 2015/0266243 A1 | 9/2015 | Mark et al. | |
| 2015/0291833 A1 | 10/2015 | Kunc et al. | |
| 2015/0314532 A1* | 11/2015 | Gordon | B29C 64/106 264/401 |
| 2016/0096326 A1 | 4/2016 | Naware | |
| 2016/0114532 A1* | 4/2016 | Schirtzinger | B29C 64/118 428/411.1 |
| 2016/0120040 A1 | 4/2016 | Elmieh et al. | |
| 2016/0136897 A1 | 5/2016 | Nielsen-Cole et al. | |
| 2016/0159009 A1 | 6/2016 | Canale | |
| 2016/0207259 A1 | 7/2016 | Fruth | |
| 2016/0230283 A1 | 8/2016 | Tseliakhovich et al. | |
| 2016/0236299 A1 | 8/2016 | Oberhofer | |
| 2016/0271874 A1* | 9/2016 | Tsai | B29C 64/112 |
| 2016/0303793 A1 | 10/2016 | Ermoshkin et al. | |
| 2016/0332363 A1 | 11/2016 | Moore et al. | |
| 2016/0375491 A1 | 12/2016 | Swaminathan et al. | |
| 2017/0014906 A1 | 1/2017 | Ng et al. | |
| 2017/0028623 A1 | 2/2017 | Evans et al. | |
| 2017/0028628 A1 | 2/2017 | Evans et al. | |
| 2017/0028633 A1 | 2/2017 | Evans et al. | |
| 2017/0028635 A1 | 2/2017 | Evans et al. | |
| 2017/0028638 A1 | 2/2017 | Evans et al. | |
| 2017/0028644 A1 | 2/2017 | Evans et al. | |
| 2017/0129180 A1 | 5/2017 | Coates et al. | |
| 2017/0136545 A1 | 5/2017 | Yoshimura et al. | |
| 2017/0157845 A1* | 6/2017 | Bihari | B33Y 30/00 |
| 2017/0341307 A1 | 11/2017 | Vilajosana et al. | |
| 2018/0029296 A1 | 2/2018 | Van Esbroeck et al. | |
| 2018/0117836 A1* | 5/2018 | Reese | B33Y 70/00 |
| 2018/0126667 A1 | 5/2018 | Wilenski et al. | |
| 2018/0126671 A1 | 5/2018 | Wilenski et al. | |
| 2018/0361660 A1 | 12/2018 | Chen et al. | |

FOREIGN PATENT DOCUMENTS

| | | | |
|---|---|---|---|
| DE | 102015002967 | 10/2016 | |
| EP | 1151849 | 11/2001 | |
| EP | 2583773 | 4/2013 | |
| JP | 02130132 A * | 5/1990 | ........... B29C 64/118 |
| JP | 2015174284 | 10/2015 | |
| WO | WO 01/81031 | 11/2001 | |
| WO | WO 2006/020685 | 2/2006 | |
| WO | WO 2008/013842 | 1/2008 | |
| WO | WO 2012/039956 | 3/2012 | |
| WO | WO 2013/086577 | 6/2013 | |
| WO | WO 2014/153535 | 9/2014 | |
| WO | WO 2014138386 | 9/2014 | |
| WO | WO 2015/009938 | 1/2015 | |
| WO | WO2015193819 | 12/2015 | |
| WO | WO 2016/053681 | 4/2016 | |
| WO | WO 2016053681 | 4/2016 | |
| WO | WO 2016125138 | 8/2016 | |
| WO | WO 2016 139059 | 9/2016 | |
| WO | WO2016149181 | 9/2016 | |

OTHER PUBLICATIONS

Machine generated English translation of the abstract of DE102015002967, downloaded from Espacenet.com Jun. 12, 2018.
European Patent Office, Extended European Search Report for related European Application No. 17198281, dated Apr. 9, 2018.
Machine generated English translation of CN 103817937, dated Mar. 26, 2018.
Machine generated English translation of abstract for DE 201310103973 downloaded from Espacenet.com on Nov. 1, 2017.

(56) References Cited

OTHER PUBLICATIONS

Ogale et al., "Fabrication of Fiber Reinforced Plates with Curvilinear Layout by 3-D Photolithography," 26$^{th}$ International SAMPE Technical Conference, vol. 26, pp. 54-61, Oct. 17-20, 1994.
Ogale et al., "3-Dimensional Composite Photolithography," Proceedings of the American Society for Composites, Eleventh Technical Conference, pp. 822-828, Oct. 7-9, 1996.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Gupta et al., "Dual Curing of Carbon Fiber Reinforced Photoresins for Rapid Prototyping," Polymer Composites, vol. 23, No. 6, pp. 1162-1170, Dec. 2002.
Hu et al., "Sensing, Modeling and Control for Laser-Based Additive Manufacturing," International Journal of Machine Tools and Manufacture, No. 43, pp. 51-60, 2003.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Website screenshots showing "Fiber Composite 3D Printing," from MakeZine.com website, downloaded on Jun. 2, 2015.
User Manual for 3Doodler 2.0, from The3Doodler.com website, downloaded on Aug. 19, 2015.
Printout of online article "Automated Fiber Placement," from AutomatedDynamics.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Website screenshots showing The Mark One Composite 3D Printer, from MarkForged.com website, downloaded on Aug. 19, 2015.
Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Printout of online article "Carbon3D Introduces Breakthrough CLIP Technology for Layerless 3D Printing, 25-100x Faster," Mar. 17, 2015, from 3Ders.org website, downloaded on Aug. 19, 2015.
Website screenshots showing the Form 1+ SLA 3D Printer, from FormLabs.com website, downloaded on Aug. 20, 2015.
Printout of website showing FormLabs, Frequently Asked Questions (re the Form1+ SLA 3D Printer), from FormLabs.com website, downloaded on Aug. 19, 2015.
Website screenshots of online how-to article, "Fiber Composite 3D Printing (The Bug)," from Instructables.com website, downloaded on Aug. 20, 2015.
Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.
Printout of online article, Jeff Sloan, "Arevo Labs launches 3D printing platform for composite parts fabrication," Nov. 16, 2015, from CompositesWorld.com website, downloaded on Dec. 9, 2015.
Printout of online article, "Improving Additive Manufacturing (3D Printing) using Infrared Imaging," Aug. 10, 2016, from AZoM.com website, downloaded on Nov. 4, 2016.
Website screenshots showing Stratonics ThermaViz® Sensor Systems, from Stratonics.com website, downloaded on Nov. 4, 2016.

\* cited by examiner

SYSTEMS AND METHODS FOR ADDITIVE MANUFACTURING

FIELD

The present disclosure relates to additive manufacturing.

BACKGROUND

Current additive manufacturing techniques that use thermoplastic resin feedstocks typically melt the resin as it is being dispensed and layer the resin against a previously dispensed and hardened layer. Current additive manufacturing techniques that use thermoset resin feedstocks typically fully cure the resin as it is being dispensed and placed the fully cured material against a previously dispensed and fully cured layer. In both applications, poor adhesion between adjacent layers may result, thereby creating parts that are prone to separation and peeling.

SUMMARY

Systems and methods for additive manufacturing are disclosed. Systems comprise a delivery guide and a source of curing energy. The delivery guide is configured to dispense a curable material to additively manufacture a part in sequential layers of the curable material. The source of curing energy is configured to direct the curing energy to a discrete region of the curable material forward of or at a location where a subsequent layer of the curable material is dispensed from the delivery guide against a preceding layer of the curable material to cure together the subsequent layer and the preceding layer. Methods comprise dispensing a subsequent layer of a curable material against a preceding layer of the curable material, and concurrently with the dispensing, directing curing energy to a discrete region of the curable material to cure together the subsequent layer and the preceding layer.

DESCRIPTION

Systems and methods for additive manufacturing are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
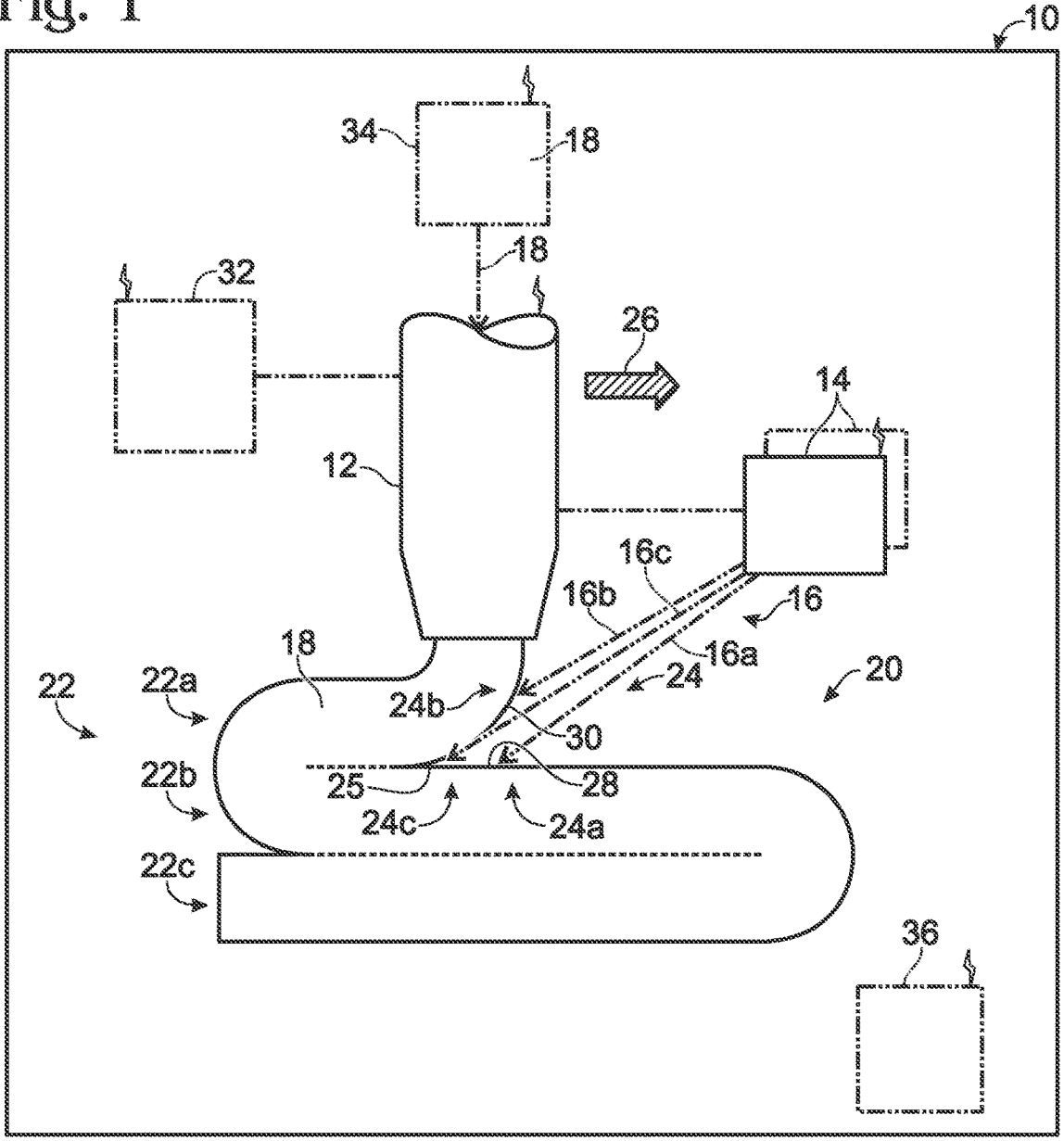
FIG. 1 is a schematic diagram representing systems for additive manufacturing.

With reference to FIG. 1, systems 10 for additive manufacturing comprise at least a delivery guide 12 and a source 14 of curing energy 16. The delivery guide 12 is configured to dispense a curable material 18 to additively manufacture a part 20 in sequential layers 22 of the curable material 18. The source 14 of curing energy 16 is configured to direct the curing energy 16 to a discrete region 24 of the curable material 18 that is forward of or at a location 25 where a subsequent layer 22a of the curable material 18 is dispensed from the delivery guide 12 against a preceding layer 22b of the curable material 18 to cure together the subsequent layer 22a and the preceding layer 22b. As used herein, a layer 22 refers to a discrete length of curable material 18 having been dispensed from the delivery guide 12, and against which a subsequent layer 22a may be deposited and/or which may be deposited against a preceding layer 22b. Layers 22 are not limited by orientation or shape, such as by linear lengths of curable material 18 that are stacked vertically, and any orientation and shape of lengths of curable material 18 may define a layer 22.

Curable material 18 may take any suitable form, such that it is configured to be cured by a curing energy 16. Illustrative, non-exclusive examples of curable materials 18 include (but are not limited to) a thermoset resin, a photopolymer, an ultra-violet photopolymer, a visible-light photopolymer, an infrared-light photopolymer, and an x-ray photopolymer. As used herein, a photopolymer is a polymer that is configured to be cured in the presence of light, such as one or more of ultra-violet light, visible-light, infrared-light, and x-rays. Additionally or alternatively, a curable material 18 may be configured to be cured in the presence of an electron beam.

In some examples, the curable material 18 may include a fiber reinforcing structure or structures, examples of which include (but are not limited to) carbon fibers, glass fibers, synthetic organic fibers, aramid fibers, natural fibers, wood fibers, boron fibers, silicon-carbide fibers, ceramic fibers, optical fibers, wires, metal wires, and conductive wires. In such examples, the curable material 18 may be described as a fiber reinforced composite material.

In some examples, the curable material 18 may include cationic and/or anionic photoinitiators, examples of which include sulfonium and iodonium salts. Systems 10 may facilitate so-called dark reactions, in which the curable material 18 continues to cure after curing energy 16 is removed from, that is, no longer applied to, the curable material 18. Moreover, in some such examples, the curing of the curable material 18 may propagate from the discrete region 24 to adjacent regions of the curable material 18 without the curing energy 16 being directed at the adjacent regions.

As mentioned, the source 14 of curing energy 16 directs the curing energy 16 to a discrete region 24 of the curable material 18. By a "discrete" region 24, it is meant that the curing energy 16 is directed to only a portion of the curable material 18 that has been dispensed from the delivery guide 12, as opposed to being directed to an entirety of the curable material 18 having been dispensed from the delivery guide 12. Moreover and as also mentioned, the discrete region 24 is either forward of or at the location 25 where a subsequent layer 22a is dispensed against a preceding layer 22b. In other words, as the delivery guide 12 moves in a direction 26, the location 25, and thus the discrete region 24, also moves in the direction 26. Stated differently, as the delivery guide 12 moves to dispense the curable material 18, not only does the location 25 move with the delivery guide 12, but also the discrete region 24 where the curing energy 16 is targeted moves with the delivery guide 12. As a result, the curable material 18 is thereby dispensed into the curing energy 16. The curing energy 16 may be described as leading the dispensing of the curable material 18. Moreover, due to this arrangement, less than an entirety of an outer surface of a layer 22 receives the curing energy 16 as the layer 22 is being dispensed from the delivery guide 12. For example, in the orientation of FIG. 1, only a lower side of the subsequent layer 22a is receiving the curing energy 16, and the upper side of the subsequent layer 22a is not receiving any direct curing energy at all.

As also mentioned, the curing energy 16 is directed to cure together the subsequent layer 22a and the preceding layer 22b. By "cure together," it is meant that where the curable material 18 of two adjacent layers 22 engage each other, such curable material 18 is cured together in time, as opposed to such curable material 18 of the preceding layer 22b having been cured prior in time to the such curable material 18 of the subsequent layer 22a. That is not to say, however, that the entirety of a layer 22 is cured together in time with the entirety of an adjacent layer. For example, with reference to FIG. 1 and using "upper" and "lower" solely as convenience with respect to the orientation of FIG. 1, as subsequent layer 22a is being dispensed against preceding layer 22b, and thus as a lower portion of layer 22a and an upper portion of layer 22b come into contact with each other, the lower portion of layer 22a and the upper portion of layer 22b are cured together. In some instances, the curing together of adjacent layers 22 may effectively eliminate the definition of layers 22 as they are being dispensed. Accordingly, In FIG. 1, the delineation between layers 22 are illustrated in broken lines, schematically representing where the layers 22 were initially dispensed, but that upon being cured together, the layer 22, in effect, may no longer exist as distinct layers. This curing together of adjacent layers 22 additionally or alternatively may be described as the co-curing of layers 22. Such resulting parts 20 may be less prone to separation or peeling, and in some instances, may completely avoid separation or peeling along the vectors defined by boundaries of layers 22.

In FIG. 1, which schematically represents a system 10 in the process of dispensing a third of three layers 22, the first layer 22c may be fully cured together with a lower portion of the second layer 22b, whose upper right portion may be uncured but whose upper left portion may be fully cured together with a lower portion of the third layer 22a, and the upper portion of the third layer 22a may be uncured.

With continued reference to FIG. 1, in some systems 10 and/or in some implementations of systems 10, a discrete region 24a consists of an exposed side 28 of the preceding layer 22b that is directly forward of the subsequent layer 22a as the subsequent layer 22a is being dispensed from the delivery guide 12. That is, in some examples, the curing energy 16a is directed solely at the exposed side 28 of the preceding layer 22b and not at the curable material 18 as it is being dispensed. In such examples, and in particular when the curable material 18 includes photoinitiators that facilitate dark reactions, the directing of the curing energy 16a at the exposed side 28 initiates curing of the curable material 18 at the exposed side 28 and the curing propagates from the location of impingement by the curing energy 16 to the subsequent layer 22a as it is dispensed against the preceding layer 22b.

With continued reference to FIG. 1, in other systems 10 and/or in other implementations of systems 10, a discrete region 24b consists of a forward side 30 of the curable material 18 as the curable material 18 is being dispensed from the delivery guide 12 to define the subsequent layer 22a. That is, in some examples, the curing energy 16b is directed solely at the forward side 30 of the curable material 18 as it is being dispensed and not at the preceding layer 22b. In such examples, and in particular when the curable material 18 includes photoinitiators that facilitate dark reactions, the directing of the curing energy 16b at the forward side 30 initiates curing of the curable material 18 at the forward side 30 and the curing propagates from the location of impingement by the curing energy 16b to the preceding layer 22b as the subsequent layer 22a is dispensed against it. The forward side 30 of the curable material 18 as it is being dispensed is the side of the curable material 18 that comes into contact with the preceding layer 22b as the subsequent layer 22a is dispensed against the preceding layer 22b.

With continued reference to FIG. 1, in other systems 10 and/or in other implementations of systems 10, a discrete region 24c consists both of the exposed side 28 of the preceding layer 22b that is directly forward of the subsequent layer 22a as it is being dispensed from the delivery guide 12 and the forward side 30 of the curable material 18 as it is being dispensed from the delivery guide 12 to define the subsequent layer 22a. In other words, in such examples, the discrete region 24c includes the location 25 where the subsequent layer 22a comes into contact with the preceding layer 22b. In such examples, both the preceding layer 22b and the subsequent layer 22a receive the curing energy 16c and are cured together as the subsequent layer 22a is dispensed against the preceding layer 22b.

Additionally or alternatively, in some systems 10 a discrete region 24 may comprise two or more of discrete region 24a, discrete region 24b, and discrete region 24c. In some such systems 10, the curing energy 16 may span two or more of such discrete regions 24 and/or may include two or more distinct vectors of curing energy 16 from source 14. Moreover, when discrete vectors of curing energy 16 are utilized, such as corresponding to two or more of curing energy 16a, curing energy 16b, and curing energy 16c, such vectors may vary in intensity, in duration, in surface area, and/or in other factors that may facilitate desired curing effects to layers 22. As an illustrative, non-exclusive example, it may be desirable to deliver a higher intensity of curing energy 16a to discrete region 24a to complete the curing of a layer preceding layer 22b, and to deliver a lesser intensity of curing energy 16b to discrete region 24b to merely initiate the curing of subsequent layer 22c.

While illustrated in FIG. 1 and generally described in terms of dispensing one layer 22 against a preceding layer 22 and curing together two adjacent layers, systems 10 also may be used to additively manufacture a part 20 in which a layer 22 may not have a directly adjacent layer 22. For example, with reference to FIG. 1, the very first deposited layer 22c does not have a preceding layer to be cured together with layer 22c. Moreover, a part 20 may be manufactured with voids, bridges, gaps, and the like, with spans of layers 22 not engaging a preceding layer. In such implementations, the system 10 may account for appropriate curing of such a layer 22.

Figure 2:
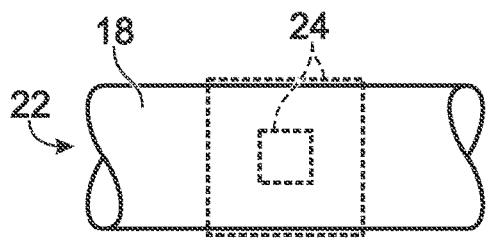
FIG. 2 is a schematic diagram illustrating discrete regions of curable material associated with systems and methods for additive manufacturing.

With reference to FIG. 2 and as schematically represented by the larger of the two dashed boxes, in some systems 10 and/or in some implementations of systems 10, the discrete region 24 spans an entire width of a respective layer 22, whether a preceding layer 22b, a subsequent layer 22a, or both a preceding layer 22b and a subsequent layer 22a. Additionally or alternatively, in some systems 10 and/or in some implementations of systems 10, the curing energy 16 may be directed to an area that is wider than an entire width of a respective layer 22.

With continued reference to FIG. 2 and as schematically represented by the smaller of the two dashed boxes, in other systems 10 and/or in some other implementations of systems 10, the discrete region 24 spans less than an entire width of a respective layer 22. Some such examples may thereby facilitate layering of the curable material 18 and co-curing of adjacent layers 22 in three dimensions. In other words, and with reference to FIG. 2, such examples may facilitate co-curing of adjacent layers 22 as created in the upward direction of FIG. 2 as well as in a direction that is into and out of the page of FIG. 2. Moreover, when utilizing curable material 18 with photoinitiators that facilitate dark reactions, such examples of systems 10 may result in the curing propagating from the location of impingement by the curing energy 16 to adjacent regions of the respective layer 22, as well as to a subsequent layer 22a.

Additionally or alternatively, the intensity of the curing energy 16 may vary across the width of a layer 22. As an illustrative, non-exclusive example, it may be desirable to deliver a higher intensity of curing energy 16 to a middle region of a layer 22 and to deliver a lesser intensity of curing energy 16 to edge regions of the layer 22. In some such examples, the curing energy 16 may be described as a Gaussian distribution. In other examples, it may be desirable to deliver a higher intensity of curing energy 16 to edge regions of a layer 22 and to deliver a lesser intensity of curing energy 16 to a middle region of the layer 22. In some such examples, the curing energy 16 may be described as having a dual Gaussian distribution. Additionally or alternatively, in some implementations of systems 10, it may be desirable to vary the intensity of the curing energy 16 in time, and thus along a length of a layer 22.

Sources 14 of curing energy 16 may take any suitable form and may provide any suitable type of curing energy 16, depending on a configuration of system 10, on a curable material 18 being utilized by a system 10, etc. Moreover, a system 10 may include more than one source 14 of curing energy 16, as schematically represented in FIG. 1. In some examples, source 14 may be described as being broadband or as being filtered broadband. A source 14 may direct curing energy 16 of a single wavelength or may direct curing energy 16 of multiple wavelengths depending on a specific application, such as depending on a specific curable material 18 utilized by a system 10. In some systems 10, the curing energy 16 may be described as incoherent energy. In other systems 10, the curing energy 16 may be described as coherent energy. In some systems 10, the curing energy 16 may comprise uncollimated light. In other systems 10, the curing energy 16 may comprise collimated light. Curing energy 16 may be delivered with current or voltage modulation, such as pulse width modulation, of the source 14.

As an illustrative, non-exclusive example, the curing energy 16 may comprise an energy beam, such as a laser beam or an electron beam. As used herein, an energy beam refers to a discrete, focused stream of energy that can be directed at a discrete region 24 and may include, for example, one or more of ultra-violet light, visible light, infrared light, x-rays, or electrons.

In some such examples, a source 14 of curing energy 16 comprises a mirror-positioning system that is configured to actively direct the energy beam to the discrete region 24. In some examples, the source 14 of curing energy 16 is stationary relative to the delivery guide 12.

In other examples, and as schematically and optionally represented in FIG. 1, the source 14 of curing energy 16 is operatively coupled relative to the delivery guide 12 and is configured to move with the delivery guide 12. For example, in some such examples, the source 14 of curing energy 16 is configured to precede the delivery guide 12 as the delivery guide 12 moves. For example, the source 14 of curing energy 16 may be operatively coupled relative to the delivery guide 12 to rotate about the delivery guide 12 as the delivery guide 12 changes direction of movement, with the source 14 of curing energy 16, or at least a portion thereof that emits the curing energy 16, preceding the delivery guide 12 as it moves. In some examples, the rotational position of the source 14 relative to the delivery guide 12 may be actively controlled, such as by controller 36. In other examples, the rotational position of the source 14 relative to the delivery guide 12 may be passively controlled, such as based exclusively on active control of the movement and rotation of the delivery guide 12. Other arrangements also are within the scope of the present disclosure.

As schematically represented in FIG. 1, some systems 10 further comprise a drive assembly 32 that is operatively coupled to the delivery guide 12 and that is configured to actively move the delivery guide 12 in three dimensions to additively manufacture the part 20. As illustrative, non-exclusive examples, an optional drive assembly 32 may comprise or be one or more of a robotic arm and a print head drive assembly that facilitates movement of the delivery guide 12 in multiple degrees of freedom. In some examples, the drive assembly 32 may be configured to move the delivery guide 12 orthogonally in three dimensions. In some examples, the drive assembly 32 may be configured to move the delivery guide 12 in three dimensions with at least three degrees of freedom, with at least six degrees of freedom, with at least nine degrees of freedom, or with at least twelve degrees of freedom.

With continued reference to FIG. 1, some systems 10 further comprise a feedstock source 34 that is operatively coupled to the delivery guide 12 and that is configured to supply the curable material 18 to the delivery guide 12. As mentioned, curable material 18 may take any suitable form, such as depending on a particular application or particular configuration of system 10.

With continued reference to FIG. 1, some systems 10 further comprise a controller 36 that is operatively coupled to one or more of the delivery guide 12, the source 14 of curing energy 16, the optional drive assembly 32, and the optional feedstock source 34. In such examples, the controller 36 is configured to control the additive manufacturing of the part 20. Controller 36 may be any suitable device or devices that are configured to perform the functions of the controller 36 discussed herein. For example, the controller 36 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems 10 and/or methods disclosed herein.

Additionally or alternatively, the controller 36 may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

In FIG. 1, communication between controller 36 and various component parts of system 10 is schematically represented by lightning bolts. Such communication may be wired and/or wireless in nature.

Figure 3:
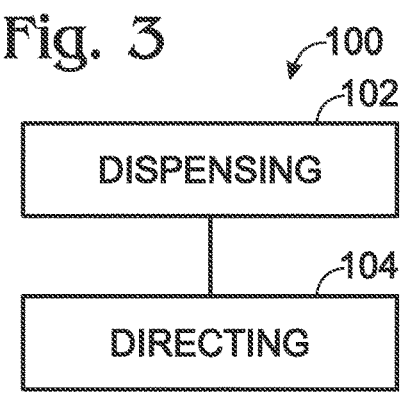
FIG. 3 is a flowchart schematically representing methods for additive manufacturing.

FIG. 3 schematically provides a flowchart that represents illustrative, non-exclusive examples of methods 100 of additively manufacturing. The methods and steps illustrated in FIG. 3 are not limiting and other methods and steps are within the scope of the present disclosure, including methods having greater than or fewer than the number of steps illustrated, as understood from the discussions herein, such as in connection with systems 10. Moreover, methods 100 may (but are not required to be) implemented, or performed, by a system 10. Reference numerals corresponding to aspects of systems 10 may be used for corresponding aspects associated with methods 100, with such corresponding aspects optionally being, but not required to be, the specific aspects of systems 10 as initially introduced herein.

Methods 100 comprise at least the steps of dispensing 102 a subsequent layer 22a of a curable material 18 against a preceding layer 22b of the curable material 18, and concurrently with the dispensing 102, directing 104 curing energy 16 to a discrete region 24 of the curable material 18 to cure together the subsequent layer 22a and the preceding layer 22b.

As mentioned in connection with systems 10, the discrete region 24 relates to a portion of the curable material to which the curing energy 16 is directed. Moreover, by "cure together," it is meant that where the curable material 18 of two adjacent layers 22 engage each other, such curable material 18 is cured together in time; however, it is not meant that the entirety of two adjacent layers 22 are necessarily fully cured together in time.

In some methods 100 and with reference to the schematic representation of systems 10 in FIG. 1, the discrete region 24a consists of an exposed side 28 of the preceding layer 22b that is directly forward of the subsequent layer 22a as the subsequent layer is being dispensed. In such methods 100, the directing 104 may result in the initiation of curing of the curable material 18 at the exposed side 28 and propagation of the curing from the exposed side 28 to the subsequent layer 22a as it is dispensed against the preceding layer 22b. That is, some methods 100 may be described as comprising initiating curing of the preceding layer 22b at the exposed side 28 and propagating the curing from the exposed side 28 to the subsequent layer 22a as a result of it being dispensed against the preceding layer 22b.

In other methods 100, the discrete region 24b consists of a forward side 30 of the curable material 18 as the curable material 18 is being dispensed to define the subsequent layer 22a. In such methods 100, the directing 104 may result in the initiation of curing of the curable material 18 at the forward side 30 and propagation of the curing from the forward side 30 to the preceding layer 22b as the forward side engages the preceding layer 22b to become the subsequent layer 22a. That is, some methods 100 may be described as comprising initiating curing of the curable material 18 just in time prior to it defining the subsequent layer 22a and propagating the curing from the subsequent layer 22a to the preceding layer 22b.

In yet other methods 100, the discrete region 24c consists of both an exposed side 28 of the preceding layer 22b that is directly forward of the subsequent layer 22a as the subsequent layer 22a is being dispensed and a forward side 30 of the curable material 18 as the curable material 18 is being dispensed to define the subsequent layer 22a. In such methods 100, the discrete region 24c includes the location 25 wherein the subsequent layer 22a comes into contact with the preceding layer 22b as a result of the dispensing 102. Accordingly, some methods 100 may be described as comprising initiating curing of the curable material 18 at the location 25 that includes both the preceding layer 22b and the subsequent layer 22a.

Additionally or alternatively and as discussed in connection with systems 10, in some methods 100, a discrete region 24 may comprise two or more of discrete region 24a, discrete region 24b, and discrete region 24c. In some such methods 100, the curing energy 16 may span two or more of such discrete regions 24 and/or may include two or more distinct vectors of curing energy 16. Moreover, when discrete vectors of curing energy 16 are utilized, such as corresponding to two or more of curing energy 16a, curing energy 16b, and curing energy 16c, such vectors may vary in intensity, in duration, in surface area, and/or in other factors that may facilitate desired curing effects to layers 22. As an illustrative, non-exclusive example, it may be desirable to deliver a higher intensity of curing energy 16a to discrete region 24a to complete the curing of a preceding layer 22b, and to deliver a lesser intensity of curing energy 16b to discrete region 24b to merely initiate the curing of the subsequent layer 22a.

As also discussed in connection with systems 10, while illustrated in FIG. 1 and generally described in terms of dispensing one layer 22 against a preceding layer 22 and curing together two adjacent layers, methods 100 also may be used to additively manufacture a part 20 in which a layer 22 may not have a directly adjacent layer 22. For example, with reference to FIG. 1, the very first deposited layer 22c does not have a preceding layer to be cured together with layer 22c. Moreover, a part 20 may be manufactured with voids, bridges, gaps, and the like, with spans of layers 22 not engaging a preceding layer. In such examples, the method 100 may account for appropriate curing of such a layer 22.

In some methods 100 and with reference to schematic representation of FIG. 2, the discrete region 24 spans an entire width of a respective layer 22. Additionally or alternatively, in some methods 100, the curing energy 16 may be directed to an area that is wider than an entire width of a respective layer 22.

In other methods 100, the discrete region 24 spans less than an entire width of a respective layer 22, as optionally and schematically illustrated in FIG. 2. In such methods 100, the layering of the curable material 18 and co-curing of adjacent layers 22 may be facilitated in three dimensions.

Additionally or alternatively and as discussed in connection with systems 10, in some methods 100, the intensity of the curing energy 16 may vary across the width of a layer 22. As an illustrative, non-exclusive example, it may be desirable to deliver a higher intensity of curing energy 16 to a middle region of a layer 22 and to deliver a lesser intensity of curing energy 16 to edge regions of the layer 22. In some such examples, the curing energy 16 may be described as a Gaussian distribution. In other examples, it may be desirable to deliver a higher intensity of curing energy 16 to edge regions of a layer 22 and to deliver a lesser intensity of curing energy 16 to a middle region of the layer 22. In some such examples, the curing energy 16 may be described as having a dual Gaussian distribution. Additionally or alternatively, in some implementations of systems 10, it may be desirable to vary the intensity of the curing energy 16 in time, and thus along a length of a layer 22.

Curing energy 16 utilized by methods 100 may take any suitable form, such as depending on a curable material 18 being utilized. For example, and as discussed in connection with optional systems 10, in some methods 100, the curing energy 16 comprises an energy beam, such as a laser beam or an electron beam.

In some methods 100, the dispensing 102 comprises dispensing from a delivery guide 12 and moving the delivery guide 12, and the directing 104 comprises directing the curing energy 16 from a source 14 that is operatively coupled relative to the delivery guide 12 and that moves with the delivery guide 12. In some such methods 100, the source 14 precedes the delivery guide 12 as the delivery guide 12 moves. Additionally or alternatively, in some methods 100, the source 14 is operatively coupled relative to the delivery guide 12 and rotates about the delivery guide 12 as the delivery guide 12 changes direction of movement.

Systems 10 and methods 100 may further include, have, or otherwise be associated with, any other various components, aspects, configurations, characteristics, properties, steps, etc. for additively manufacturing parts. Illustrative, non-exclusive examples of such various optional components, aspects, configurations, characteristics, properties, steps, etc. are disclosed in U.S. patent application Ser. Nos. 14/841,423; 14/841,470; 14/920,748; 14/931,573; 14/995,507; 15/063,400; 15/345,189; and Ser. No. 15/346,537, the disclosures of which are incorporated herein by reference.

Illustrative, non-exclusive examples of inventive subject matter according to the present disclosure are described in the following enumerated paragraphs:

A. A system for additive manufacturing, the system comprising:
 a delivery guide configured to dispense a curable material to additively manufacture a part in sequential layers of the curable material; and
 a source of curing energy configured to direct the curing energy to a discrete region of the curable material forward of or at a location where a subsequent layer of the curable material is dispensed from the delivery guide against a preceding layer of the curable material to cure together the subsequent layer and the preceding layer.

A1. The system of paragraph A, wherein the discrete region consists of an exposed side of the preceding layer directly forward of the subsequent layer as the subsequent layer is being dispensed from the delivery guide.

A2. The system of paragraph A, wherein the discrete region consists of a forward side of the curable material as the curable material is being dispensed from the delivery guide to define the subsequent layer.

A3. The system of paragraph A, wherein the discrete region consists of an exposed side of the preceding layer directly forward of the subsequent layer as the subsequent layer is being dispensed from the delivery guide and a forward side of the curable material as the curable material is being dispensed from the delivery guide to define the subsequent layer.

A4. The system of any of paragraphs A-A3, wherein the discrete region spans an entire width of a respective layer.

A5. The system of any of paragraphs A-A3, wherein the discrete region spans less than an entire width of a respective layer.

A6. The system of any of paragraphs A-A5, wherein the curing energy comprises an energy beam.

A6.1. The system of paragraph A6, wherein the source of curing energy comprises a mirror-positioning system configured to actively direct the energy beam to the discrete region.

A7. The system of any of paragraphs A-A6.1, wherein the source of curing energy is stationary relative to the delivery guide.

A8. The system of any of paragraphs A-A6.1, wherein the source of curing energy is operatively coupled relative to the delivery guide and configured to move with the delivery guide.

A8.1. The system of paragraph A8, wherein the source of curing energy is configured to precede the delivery guide as the delivery guide moves.

A8.2. The system of any of paragraphs A8-A8.1, wherein the source of curing energy is operatively coupled relative to the delivery guide to rotate about the delivery guide as the delivery guide changes direction of movement.

A9. The system of any of paragraphs A-A8.2, further comprising:
 a drive assembly operatively coupled to the delivery guide and configured to actively move the delivery guide in three dimensions to additively manufacture the part.

A10. The system of any of paragraphs A-A9, further comprising:
 a feedstock source operatively coupled to the delivery guide and configured to supply the curable material to the delivery guide.

A11. The system of any of paragraphs A-A10, further comprising:
 a controller operatively coupled to one or more of the delivery guide, the source of curing energy, a/the drive assembly, and a/the feedstock source and configured to control the additive manufacturing of the part.

A12. The system of any of paragraphs A-A11, wherein the system is configured to perform the method of any of paragraphs B-B8.

A13. The use of the system of any of paragraphs A-A12 to additively manufacture the part.

A14. The use of the system of any of paragraphs A-A12 to co-cure adjacent layers of the part as it is being additively manufactured.

B. A method of additively manufacturing, the method comprising:
 dispensing a subsequent layer of a curable material against a preceding layer of the curable material; and
 concurrently with the dispensing, directing curing energy to a discrete region of the curable material to cure together the subsequent layer and the preceding layer.

B1. The method of paragraph B, wherein the discrete region consists of an exposed side of the preceding layer directly forward of the subsequent layer as the subsequent layer is being dispensed.

B2. The method of paragraph B, wherein the discrete region consists of a forward side of the curable material as the curable material is being dispensed to define the subsequent layer.

B3. The method of paragraph B, wherein the discrete region consists of an exposed side of the preceding layer directly forward of the subsequent layer as the subsequent layer is being dispensed and a forward side of the curable material as the curable material is being dispensed to define the subsequent layer.

B4. The method of any of paragraphs B-B3, wherein the discrete region spans an entire width of a respective layer.

B5. The method of any of paragraphs B-B3, wherein the discrete region spans less than an entire width of a respective layer.

B6. The method of any of paragraphs B-B5, wherein the curing energy comprises an energy beam.

B7. The method of any of paragraphs B-B6,
 wherein the dispensing comprises dispensing from a delivery guide and moving the delivery guide; and
 wherein the directing comprises directing the curing energy from a source that is operatively coupled relative to the delivery guide and moves with the delivery guide.

B7.1. The method of paragraph B7, wherein the source precedes the delivery guide as the delivery guide moves.

B7.2. The method of any of paragraphs B7-B7.1, wherein the source is operatively coupled relative to the delivery guide and rotates about the delivery guide as the delivery guide changes direction of movement.

B8. The method of any of paragraphs B-B7.2, wherein the method is performed by the system of any of paragraphs A-A12.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being configured to perform a particular function may additionally or alternatively be described as being adapted to perform that function, and vice versa.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

The invention claimed is:

1. A method of additively manufacturing, the method comprising:
dispensing a subsequent layer of a curable material against a preceding layer of the curable material; and
concurrently with the dispensing, directing curing energy to a discrete region of the curable material to cure together the subsequent layer and the preceding layer, wherein the discrete region consists of a forward side of the curable material as the curable material is being dispensed to define the subsequent layer.

2. The method of claim 1, wherein the discrete region spans an entire width of a respective layer.

3. The method of claim 1, wherein the discrete region spans less than an entire width of a respective layer.

4. The method of claim 1, wherein the curing energy comprises an energy beam.

5. The method of claim 1,
wherein the dispensing comprises dispensing from a delivery guide and moving the delivery guide; and
wherein the directing comprises directing the curing energy from a source that is operatively coupled relative to the delivery guide and moves with the delivery guide.

6. The method of claim 5, wherein the source precedes the delivery guide as the delivery guide moves.

7. The method of claim 5, wherein the source is operatively coupled relative to the delivery guide and rotates about the delivery guide as the delivery guide changes direction of movement.

8. The method of claim 4,
wherein the dispensing comprises dispensing from a delivery guide and moving the delivery guide;
wherein the directing comprises directing the energy beam from a source that is stationary relative to the delivery guide; and
wherein the directing the energy beam comprises directing the energy beam from the source to the discrete region with a mirror-positioning system.

9. The method of claim 1, wherein the curable material comprises photoinitiators that facilitate dark reactions, such that the directing curing energy results in propagation of curing from the discrete region to the preceding layer.

10. A method of additively manufacturing, the method comprising:
dispensing a subsequent length of a curable material against a preceding length of the curable material; and
concurrently with the dispensing, directing curing energy only to a middle region of the curable material to cure together the subsequent length and the preceding length, wherein the middle region spans less than an entire width of a respective length;
wherein the curable material comprises photoinitiators that facilitate dark reactions, such that the directing curing energy results in propagation of curing from the middle region to edge regions of the respective length to co-cure the edge regions of the respective length with an abutted adjacent length of the curable material.

11. The method of claim 10, wherein the middle region consists of an exposed side of the preceding length directly forward of the subsequent length as the subsequent length is being dispensed.

12. The method of claim 10, wherein the middle region consists of a forward side of the curable material as the curable material is being dispensed to define the subsequent length.

13. The method of claim 10, wherein the middle region consists of an exposed side of the preceding length directly forward of the subsequent length as the subsequent length is being dispensed and a forward side of the curable material as the curable material is being dispensed to define the subsequent length.

14. The method of claim 10, wherein the curing energy comprises an energy beam.

15. The method of claim 14,
wherein the dispensing comprises dispensing from a delivery guide and moving the delivery guide;
wherein the directing comprises directing the energy beam from a source that is stationary relative to the delivery guide; and
wherein the directing the energy beam comprises directing the energy beam from the source to the middle region with a mirror-positioning system.

16. The method of claim 10,
wherein the dispensing comprises dispensing from a delivery guide and moving the delivery guide; and
wherein the directing comprises directing the curing energy from a source that is operatively coupled relative to the delivery guide and moves with the delivery guide.

17. The method of claim 16, wherein the source precedes the delivery guide as the delivery guide moves.

18. The method of claim 16, wherein the source is operatively coupled relative to the delivery guide and rotates about the delivery guide as the delivery guide changes direction of movement.

19. A method of additively manufacturing, the method comprising:
- dispensing a subsequent length of a curable material against a preceding length of the curable material; and
- concurrently with the dispensing, directing curing energy to a discrete region of the curable material to cure together the subsequent length and the preceding length, wherein an intensity of the curing energy varies across an entire width of a respective length of the curable material according to a Gaussian distribution such that the intensity of the curing energy is greater at a middle region of the respective length than at edge regions of the respective length and resulting in the edge regions of the respective length co-curing with an abutted adjacent length of the curable material.

20. The method of claim 19, wherein the intensity of the curing energy varies in time along a length of the length.

21. The method of claim 19, wherein the discrete region consists of an exposed side of the preceding length directly forward of the subsequent length as the subsequent length is being dispensed.

22. The method of claim 19, wherein the discrete region consists of a forward side of the curable material as the curable material is being dispensed to define the subsequent length.

23. The method of claim 19, wherein the discrete region consists of an exposed side of the preceding length directly forward of the subsequent length as the subsequent length is being dispensed and a forward side of the curable material as the curable material is being dispensed to define the subsequent length.

* * * * *